Figure 1:
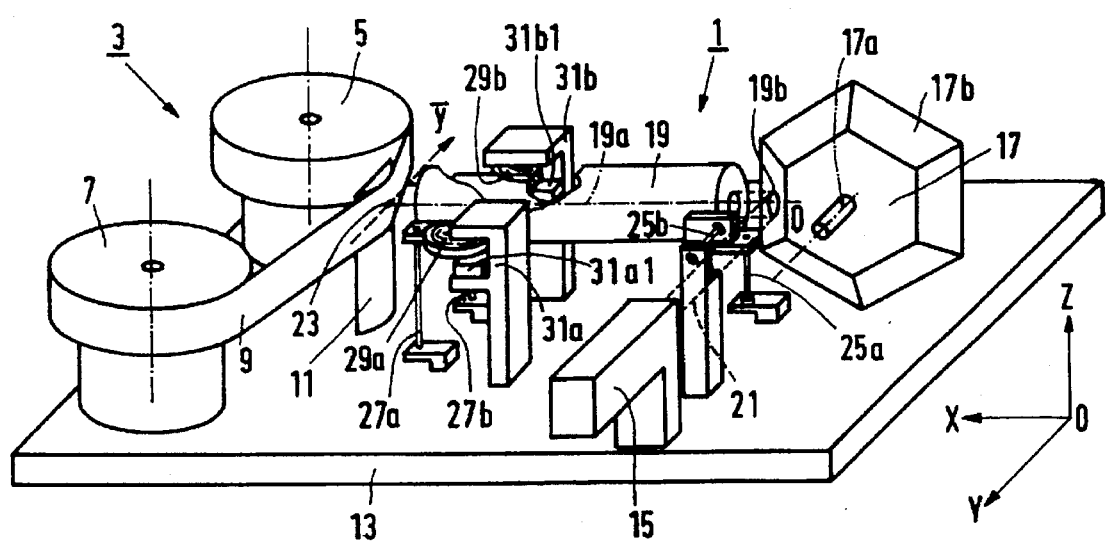

United States Patent [19]
Van Rosmalen

[11] Patent Number: 5,661,704
[45] Date of Patent: Aug. 26, 1997

[54] OPTICAL UNIT FOR OPTICALLY SCANNING AN INFORMATION SURFACE, AND OPTICAL SCANNING ARRANGEMENT INCLUDING THE OPTICAL UNIT

[75] Inventor: Gerard E. Van Rosmalen, Eindhoven, Netherlands

[73] Assignee: U.S. Philips Corporation, New York, N.Y.

[21] Appl. No.: 566,773

[22] Filed: Dec. 4, 1995

[30] Foreign Application Priority Data

Dec. 5, 1994 [EP] European Pat. Off. .............. 94203535

[51] Int. Cl.$^6$ ............................... G11B 7/00; G02B 7/02
[52] U.S. Cl. .................... 369/44.14; 369/44.22; 359/824
[58] Field of Search ........................... 369/44.11, 44.14, 369/44.32, 100, 43, 44.15, 44.17, 44.21, 44.22, 112; 359/811, 813, 814, 815, 822, 823, 824

[56] References Cited

U.S. PATENT DOCUMENTS

| 4,773,055 | 9/1988 | Gijzen | 369/44.32 X |
| 4,901,297 | 2/1990 | Komatsu et al. | 369/13 |
| 5,263,013 | 11/1993 | Kang | 369/44.14 X |

FOREIGN PATENT DOCUMENTS 0459585  12/1991  European Pat. Off. .
0459586  12/1991  European Pat. Off. .

OTHER PUBLICATIONS

"The Optical Industry & Systems Directory", 1972–1973, 10th Edition; The International Encyclopedia of Optical, Electro–optical and Laser Technology, pp. 6;27 and 6;7, respectively.

Primary Examiner—P. W. Huber
Attorney, Agent, or Firm—Daniel E. Tierney

[57]   ABSTRACT

An optical unit (1) is provided for optically scanning a surface, particularly an information surface of a recording medium (9). The unit comprises a frame (13), a radiation source unit (15), a rotatable mirror unit (17), and an objective system (19) for forming a scanning spot on the information surface, which objective system has an entrance pupil (19b) and an optical axis (19a). From an optical point of view, the rotatable mirror unit is situated between the radiation source unit and the objective system, suspension means being provided for movably supporting the objective system relative to the frame. The suspension means allow a longitudinal movement of the objective system along the optical axis and a pivotal movement of the objective system about a pivot which coincides with the point of intersection of the optical axis and the entrance pupil. Actuating means drive the objective system in accordance with these movements.

7 Claims, 1 Drawing Sheet

OPTICAL UNIT FOR OPTICALLY SCANNING AN INFORMATION SURFACE, AND OPTICAL SCANNING ARRANGEMENT INCLUDING THE OPTICAL UNIT

FIELD OF THE INVENTION

The invention relates to an optical unit for optically scanning a surface, which unit comprises a frame, a radiation source unit, a rotatable mirror unit, and means for forming a scanning spot on the surface.

The invention further relates to an optical scanning arrangement including an optical unit for optically scanning a surface of a medium, particularly an information or recording medium, which unit comprises a frame, a radiation source unit, a rotatable mirror unit, and means for forming a scanning spot on the surface.

BACKGROUND OF THE INVENTION

An optical unit and an arrangement including such a unit are known from U.S. Pat. No. 4,901,297. The known arrangement comprises a magneto-optical apparatus for recording and reading information in/from a recording medium in tape form. In order to form a scanning spot the known apparatus comprises inter alia a laser oscillator, a focusing lens, a polygon mirror which is rotatably supported in a frame, and a correction lens. The known arrangement further includes means for generating a magnetic field during information recording. During recording the recording medium is moved relative to the optical unit and recording tracks are formed on the recording medium in tape form, which tracks are oriented substantially transversely of the direction of movement of this medium. The laser oscillator is mounted on a piezoelectric actuator unit for adjusting the direction of an emitted laser beam so as to keep the scanning spot on a track to be scanned, which is generally referred to as tracking. From an optical point of view, the focusing lens is situated between the laser oscillator and the polygon mirror and is coupled to an actuator unit for focusing the laser beam so as to form a scanning spot situated in a recording or information layer of the medium. Optically, the correction lens is disposed between the polygon mirror and the recording medium.

During use of the known arrangement the laser oscillator is pivoted for the purpose of tracking, pivoting being effected so as to vary the direction of the light beam emerging from the laser oscillator. A disadvantage of the known construction is that the pivoting range is comparatively small owing to the limited field size of the optical system used. As a result, tracking is possible only over a small range, so that only comparatively small speed variations of the recording medium can be corrected. In order to compensate for the limited tracking range the known arrangement requires an accurate speed control for the recording medium. The use of a capstan for this purpose is known per se.

Another disadvantage of the known arrangement is that during scanning of the recording medium both the laser source and the focusing lens have to be moved to permit tracking and focusing. The number of supporting elements and actuators required for this purpose leads to a complex arrangement. Moreover, the required movements of the laser source and the focusing lens demand additional space, which makes the arrangement rather bulky. In addition, the movably arranged laser source gives rise to specific problems with respect to its shielding, its heat dissipation and its electrical connections.

SUMMARY OF THE INVENTION

It is an object of the invention to provide an optical unit for optically scanning a surface, which unit has provisions for moving a scanning spot over a substantial distance without the optical unit itself being moved.

To this end the optical unit in accordance with the invention is characterised in that the means for forming the scanning spot include an objective system having an entrance pupil and an optical axis, the rotatable mirror unit being situated, from an optical point of view, between the radiation source unit and the objective system, suspension means being provided for movably supporting the objective system relative to the frame, which suspension means allow a longitudinal movement of the objective system along the optical axis and a pivotal movement of the objective system about a pivot which at least substantially coincides with the point of intersection of the optical axis and the entrance pupil, and the actuating means being provided for driving the objective system in accordance with these movements.

For a definition of entrance pupil and a definition of optical axis reference can be made, for example, to "The optical industry & systems directory", 1972–1973, 10th Edition; The International Encyclopedia of Optical, Electro-optical and Laser Technology, p. 6–27 and 6–7, respectively (herewith incorporated by reference).

In the optical unit in accordance with the invention a scanning beam can be focused to form the scanning spot and the scanning spot can be moved over the surface in that the objective system performs movements permitted by the supporting means. The laser source unit does not play any part in this respect and can simply be secured stationarily to the frame. The actuating means ensure that the objective system is moved in directions transverse to the surface to be scanned for focusing purposes and can perform pivotal movements for the purpose of moving the scanning spot over the surface. Pivoting about the pivot defined above precludes loss of light and image disturbance.

The objective system may comprise one or more lenses. An important advantage of the optical unit in accordance with the invention is that only a small central portion of the field of the lens or lenses has to be used, so that hardly any distortion occurs in the image field on the medium to be scanned. This enables a well-defined scanning path to be obtained.

The constructional measures used in the optical unit in accordance with the invention can be implemented simply and require only a limited space. As a result of this, a compact construction is possible.

It is to be noted that the mirror unit used in the optical unit in accordance with the invention may be a mirror unit which is known per se. A suitable mirror unit is known from European Patent EP 0,459,585 ; herewith incorporated by reference) and is constructed as a polygon mirror, which is suspended electromagnetically and which can be driven about an axis of rotation by electromagnetic driving forces. The polygon mirror has a plurality of, for example six, mirror faces extending parallel to the axis of rotation or at an angle of 45° relative to this axis. From an optical point view, the polygon mirror in the unit in accordance with the invention is situated between the radiation source and the objective system. As the polygon mirror rotates the mirror faces reflect a light beam emitted by a laser source so as to deflect it to the objective system.

An embodiment of the optical unit in accordance with the invention is characterised in that the suspension means include a first suspension unit situated near the entrance pupil, a second suspension unit which, viewed along the optical axis, is remote from the entrance pupil, which suspension units connect the objective system to the frame and allow the longitudinal movement of the objective system and a pivotal movement of the objective system about a pivotal axis disposed transversely of the optical axis and at least substantially in the entrance pupil. The suspension units preferably comprise hinge elements, such as blade springs, resilient wires or integral hinge units, which extend between the objective system and the frame. Suspension units comprising such elements are of simple construction, reliable and accurate. As an alternative, the suspension unit disposed near the entrance pupil may comprise a sliding/pivoting suspension element.

An embodiment of the unit in accordance with the invention is characterised in that the actuating means are means comprising an electric coil unit and a permanent magnet unit, one of the units being secured to the objective system and the other one of the units being secured to the frame. In order to minimise the movable mass it is preferred to secure magnets to the frame and coils to the objective system, which coils in operation cooperate with said magnets to provide a well-defined movement of the objective system.

It is another object of the invention to simplify the arrangement of the type defined above and to make it better usable.

To this end the optical arrangement in accordance with the invention is characterised in that the means for forming the scanning spot on the surface to be scanned include an objective system having an entrance pupil and an optical axis, the rotatable mirror unit being situated, from an optical point of view, between the radiation source unit and the objective system, suspension means being provided for movably supporting the objective system relative to the frame, which suspension means allow a longitudinal movement of the objective system along the optical axis and a pivotal movement of the objective system about a pivot which at least substantially coincides with the point of intersection of the optical axis and the entrance pupil, actuating means being provided for driving the objective system in accordance with the movements, and means being provided for moving the surface to be scanned and the optical unit relative to one another.

The arrangement in accordance with the invention has the same advantages as mentioned with reference to the optical unit in accordance with the invention.

The invention aims at providing a scanning arrangement of the type defined above, which has provisions to ensure that even in the case of substantial variations in the speed of movement of the medium to be scanned a satisfactory tracking is achieved.

The optical scanning arrangement in accordance with the invention is characterised in that the means for forming the scanning spot include an objective system having an entrance pupil and an optical axis, the rotatable mirror unit being situated, from an optical point of view, between the radiation source unit and the objective system, suspension means being provided for movably supporting the objective system relative to the frame, which suspension means allow a longitudinal movement of the objective system along the optical axis and a pivotal movement of the objective system about a pivot which at least substantially coincides with the point of intersection of the optical axis and the entrance pupil, and the actuating means being provided for driving the objective system in accordance with such movements, the suspension means including a first suspension unit situated near the entrance pupil, a second suspension unit which, viewed along the optical axis, is remote from the entrance pupil, which suspension units connect the objective system to the frame and allow the longitudinal movement of the objective system and a pivotal movement of the objective system about a pivotal axis disposed transversely of the optical axis and at least substantially in the entrance pupil, a tape drive unit being provided for moving an optical tape comprising the information surface past the objective system, a part of the optical tape which faces the objective system having a tape transport direction which extends at least substantially perpendicularly to the pivotal axis of the objective system.

The scanning arrangement in accordance with the invention has the same advantages as set forth with reference to the optical unit in accordance with the invention. As a result, the scanning arrangement is capable of maintaining a constant difference in speed, viewed in the tape direction, between the scanning spot and the optical tape. This may be attended by substantial excursions of the scanning spot. A further important advantage is that the effective tracking which is possible allows the use of a capstanless drive for the optical tape. Moreover, this embodiment permits a well-defined linear excursion of the scanning spot on the scanning surface of the optical tape, which excursion is oriented substantially perpendicularly to the direction of movement of the tape.

The optical scanning arrangement in accordance with the invention can be used for recording and/or reading information in digital form in/from an optical recording tape, for example a cassette tape. For this purpose, the tape or tape-like medium may be provided with a thin coating of a crystalline amorphous material (phase change material), whose structure is influenced by means of a laser source during recording, information thus being stored in a surface, the information or recording surface. The polygon mirror known from EP 0,459,585 is very suitable for this purpose. Owing to its electromagnetic suspension the polygon mirror, which has a plurality of mirror faces, can rotate very rapidly, for example with a few thousands of revolutions per second, so that the mirror each time reflects the radiation beam from the laser source unit at a different angle. The scanning arrangement is capable of recording information tracks, having for example a length of 1 mm, in a direction transverse to the direction of movement of the storage medium. Since in the scanning arrangement in accordance with the invention the optical tape and the optical unit are moved relative to one another during recording it is possible to form rows of parallel information tracks oriented transversely of the tape, which rows extend in the longitudinal direction of the tape. Reading is effect in a similar way, the radiation reflected from the tape being detected and processed by detections means which are known per se.

The scanning arrangement in accordance with the invention can be used for the digital storage of picture and sound. The scanning arrangement is also suitable for data storage or for storing, for example, medical information. At high speeds of rotation of the mirror unit, particularly the polygon mirror, high-density information storage is possible in recording tracks which are oriented transversely of the direction of movement of the information medium.

The optical unit in accordance with the invention can be used not only in the scanning arrangement in accordance with the invention described hereinbefore but also in other optical arrangements, such as for example a scanning microscope.

BRIEF DESCRIPTION OF THE DRAWING FIGURE

The invention will now be described in more detail, by way of example, with reference to the drawing, in which FIG. 1 is a diagrammatic perspective view showing an arrangement in accordance with the invention including an optical unit in accordance with the invention.

DESCRIPTION OF THE INVENTION

The scanning arrangement in accordance with the invention shown in FIG. 1 includes an optical unit 1 in accordance with the invention and a tape drive unit 3. The tape drive unit 3 comprises a drive reel 5 and a further reel 7, the unit 3 serving to move an optical tape 9 from the reel 7 to the reel 5. The tape 9 is moved past a tape guide 11 at whose location the tape transport direction is $\overline{y}$. In the present example both reels 5 and 7 are driven in order to guarantee a tape tension which is as constant as possible.

The optical unit 1 serves for optically scanning the tape 9, particularly an information surface situated in or on the tape 9. The optical unit 1 comprises a frame 13, a radiation source unit 15, which is fixedly secured to the frame 13 and which, in particular, comprises a laser source, a mirror unit 17, particularly a polygon mirror, which is rotatable about a shaft 17a and has mirror faces 17b and an objective system 19. The shaft 17a is supported in the frame 13. The objective system 19 comprises at least one objective lens and serves, inter alia, for focusing a radiation beam 21 produced by the radiation source unit so as to form a scanning spot 23 on the information surface of the tape 9. The objective system 19 has an optical axis 19a and an entrance pupil 19b situated on a mirror face 17b of the mirror unit 17.

The objective system 19 is movably supported relative to the frame 13 in such a manner that, viewed in a system of orthogonal axes XYZ having its origin O situated both on the optical axis 19a and in the entrance pupil 19b and having an X axis coincident with the optical axis 19a, a pivotal movement about the Z axis and a longitudinal movement along the X axis are possible and other movements are inhibited. In such an arrangement the tape transport direction $\overline{y}$ is parallel to the Y axis. The permissible pivotal and longitudinal movements enable small and large speed variations and positional variations, respectively, of the optical tape to be corrected effectively.

The permissible movements, i.e. the pivotal movements and the longitudinal movements, can be performed as a result of the presence of a first suspension unit situated near the entrance pupil 19b and a second suspension unit situated closer to the tape guide 11 than to the entrance pupil. In the present example both suspension units comprise two rod-shaped hinge elements 25a, 25b and 27a, 27b, respectively, secured to the frame 13 and to the objective system 19. The hinge elements 25a, 27a and 27b extend parallel to the Z axis and the hinge element 25b extends parallel to the Y axis. The elongate hinge elements are comparatively flexible in the transverse direction and stiff in the longitudinal direction. As a result of this, the suspension means used effectively constrain non-permissible movements of the objective system 19.

In order to drive the objective system 19 for the purpose of tracking and focusing the optical unit 1 in accordance with the invention comprises electromagnetic actuating means. These actuating means include an electric coil unit secured to the objective system 19 and comprising two flat electric coils 29a and 29b, and a permanent magnet unit secured to the frame 13. The permanent magnet unit comprises two yoke sections 31a and 31b for magnetic cooperation with the coils 29a and 29b, respectively. Each of the yoke sections 31a and 31b comprises a permanent magnet 31a1 and 31b1, respectively. When the coil 29a is energised the objective system 19 is subjected to an actuating force which is directed parallel to the X axis, which coincides with the optical axis 19a, and which translates the system 19 for focusing purposes. When the coil 29b is energised the objective system 19 is subjected to an actuating force which is directed parallel to the Y axis and which pivots the system 19 about the Z axis for tracking purposes. Since the tape speed is comparatively low the distance between the objective lens and the tape varies only slowly, enabling the bandwidth for focusing control to be small. A slightly larger bandwidth is necessary for tracking.

In addition to the laser source the afore-mentioned unit 15 may include a signal detector for detecting the information signals present in the radiation beam reflected from the optical tape 9. Moreover, a detector may be provided for the detection of error signals for the purpose of driving the electric coils 29a and 29b. The unit 15 may further comprise optical elements such as a collimator lens, a dividing mirror or a grating.

The optical unit 1 comprises a detection system for detecting the position and/or orientation of the polygon mirror 17. This detection system, which is not shown in FIG. 1, is preferably the optical detection system disclosed in EP 0,459,586 herewith incorporated by reference). The detection system comprises radiation-sensitive detection elements, which converts radiation spots into electric signals which provide information about the position and tilt of the polygon mirror. A processing unit analyses this information, after which correcting output signals are applied to the electromagnetic suspension for the polygon mirror 17.

It is to be noted that the invention is not limited to the embodiment disclosed herein. Particularly the suspension means and the actuating means may be implemented in another manner than shown.

I claim:

1. An optical unit for optically scanning a surface, which unit comprises a frame, a radiation source unit, a rotatable mirror unit, and means for forming a scanning spot on the surface, characterised in that the means for forming the scanning spot include an objective system having an entrance pupil and an optical axis, the rotatable mirror unit being situated, from an optical point of view, between the radiation source unit and the objective system, suspension means being provided for movably supporting the objective system relative to the frame, which suspension means allow a longitudinal movement of the objective system along the optical axis and a pivotal movement of the objective system about a pivot which at least substantially coincides with the point of intersection of the optical axis and the entrance pupil, and an actuating means being provided for driving the objective system in accordance with said movements.

2. An optical unit as claimed in claim 1, characterised in that the suspension means include a first suspension unit situated near the entrance pupil, a second suspension unit which, viewed along the optical axis, is remote from the entrance pupil, which suspension units connect the objective system to the frame and allow the longitudinal movement of the objective system and a pivotal movement of the objective system about a pivotal axis disposed transversely of the optical axis and at least substantially in the entrance pupil.

3. An optical unit as claimed in claim 2, characterised in that the actuating means are electromagnetic means comprising an electric coil unit and a permanent magnet unit, one of said units being secured to the objective system and the other one of said units being secured to the frame.

4. An optical unit as claimed in claim 3, characterised in that the electromagnetic means are spaced from the entrance pupil.

5. An optical arrangement including the optical unit as claimed in claim 1 and further including means for moving the surface to be scanned and the optical unit relative to one another.

6. An optical scanning arrangement including the optical unit as claimed in claim 2 and, further including a tape drive unit for moving an optical tape past the objective system of the optical unit, which tape comprises an information surface forming said surface, a part of the optical tape which faces the objective system having a tape transport direction which extends at least substantially perpendicularly to the pivotal axis of the objective system.

7. An optical unit as claimed in claim 1, characterised in that the actuating means are electromagnetic means comprising an electric coil unit and a permanent magnet unit, one of said units being secured to the objective system and the other one of said units being secured to the frame.

* * * * *